United States Patent
Jones

[11] 3,815,134
[45] June 4, 1974

[54] GROUND CLUTTER REDUCTION APPARATUS

[75] Inventor: Calvin C. Jones, Ellicott City, Md.

[73] Assignee: Westinghouse Electric Corporation, Pittsburgh, Pa.

[22] Filed: Aug. 23, 1972

[21] Appl. No.: 283,259

[52] U.S. Cl. .......................... 343/17.1 R, 343/5 R
[51] Int. Cl. ............................................ G01s 9/02
[58] Field of Search ............ 343/5 R, 17.1 R, 16 LS

[56] References Cited
UNITED STATES PATENTS

| | | | |
|---|---|---|---|
| 2,508,384 | 5/1950 | Gross | 343/16 LS |
| 2,510,692 | 6/1950 | Goddard | 343/16 LS |
| 2,627,020 | 1/1953 | Parnell et al. | 343/5 R X |
| 2,726,385 | 12/1955 | Moore | 343/16 LS |
| 3,112,482 | 11/1963 | Fiske | 343/16 LS X |
| 3,222,677 | 12/1965 | Fink | 343/16 LS |

Primary Examiner—Malcolm F. Hubler
Attorney, Agent, or Firm—C. L. O'Rourke

[57] ABSTRACT

A "scan down on receive" antenna system wherein time base switching of the receiver horn configuration is provided in a multifeed radar system for ground clutter reduction. After a radar pulse is transmitted, the receive beam is incrementally relocated so that the antenna is electrically made to "look up" for a short time corresponding to that portion of the interpulse period during which short and intermediate range targets are received and then "look down" for the remainder of the interpulse period during which long range targets are received. Such a system of feed switching includes an alternate receive gain path which receives clutter returns in a greatly reduced manner while continuing to receive target returns of interest, i.e., short and intermediate range targets.

9 Claims, 6 Drawing Figures

PATENTED JUN 4 1974 3,815,134

GROUND CLUTTER REDUCTION APPARATUS

BACKGROUND OF THE INVENTION

1. Field of the Invention

The present invention relates to a radar system and more particularly to a radar system wherein desired targets may be clearly identified in the presence of interfering ground return signals.

2. Description of the Prior Art

The normal method of operating a radar system is to set the elevation antenna pattern slightly above the horizon such that the horizon return signals are down about 3db in amplitude from their maximum values. The ground return signals known as "ground clutter" are at times of such a nature as to suppress the desired signals. Therefore, it is highly desirable to utilize methods of discriminating against ground clutter in order to enhance target detection.

Various methods and apparatus for suppressing ground clutter are well known to those skilled in the art and are taught for example in the following references:

U.S. Pat. No. 2,682,048, Longacre
U.S. Pat. No. 2,994,080, Varela
U.S. Pat. No. 3,126,543, Reed
U.S. Pat. No. 3,197,776, Winn The Longacre patent discloses radio object detection apparatus employing two transmitting and receiving systems for producing two radar beams with an upper beam and a lower beam. The system includes a timer which controls a blocking generator causing the output of the receiver which is tuned to the low beam to be shut off during the period of time that ground clutter would normally be received by the low beam. The patents to Reed and Varela on the other hand disclose clutter reduction systems employing a plurality of transmitted beams wherein the ground clutter signals received on the lower beam are compared with the signals received from the upper beams, thereby obtaining a signal which is free from ground clutter. This type of system employs a subtraction technique. In a similar manner, the patent to Winn discloses a receiving indicator system for radar apparatus employing a plurality of beams and in particular a lower beam which establishes a reference plane so that any signals above said plane give a positive output and any signals below said plane gives a negative output. Assuming that pulses below said plane are caused by ground clutter, the circuitry employed suppresses these negative pulses in the display system.

SUMMARY

The present invention relates to apparatus for reducing ground clutter in a radar presentation by providing an additional gain path during the receive time interval of the interpulse period utilizing a time switching technique of the return feed. This is accomplished by switching a common transmit-receive feeder means for a radar antenna system from a transmit position to a first receiving position for a predetermined time during the interpulse period which is an optimum gain path for reducing ground clutter while receiving short and intermediate range targets and then switching to a second receive position during the remainder of the interpulse period for receiving echoes from the longest range targets, said second receive position being the same position as the transmitting position of the feed configuration.

DESCRIPTION OF THE PREFERRED EMBODIMENT

In two dimensional search radars the usual practice is to provide during transmission and reception a single gain path to space. The horizontal beamwidth is maintained a minimum commensurate with reasonable horizontal aperture size. The vertical distribution may be a simple fan or perhaps a $csc^2$ distribution for coverage at the higher elevation angles. Active elements are not usually located on the rotating portion of the antenna. The operational environment may require "sighting" wherein the beam position with respect to the horizontal is varied and a compromise is made between longer range detection at the lower angles and the detection of targets over clutter where the targets are at the higher elevation angles and intermediate ranges.

The present invention is directed to an antenna feed configuration for a pulse radar which utilizes switching between multiple feed elements during the receive portion of the interpulse period which results in the beam being incrementally relocated to allow the maximum gain path to be located in the closest desired relationship with the radar horizon for ground clutter reduction. To this end, an alternate gain path is provided during the period when it is desired to "see" targets over severe clutter and wherein said alternate gain path receives target signals in an enhanced manner with respect to clutter. Thus two switched gain paths to space are provided on the rotating portion of the antenna.

Figure 1:
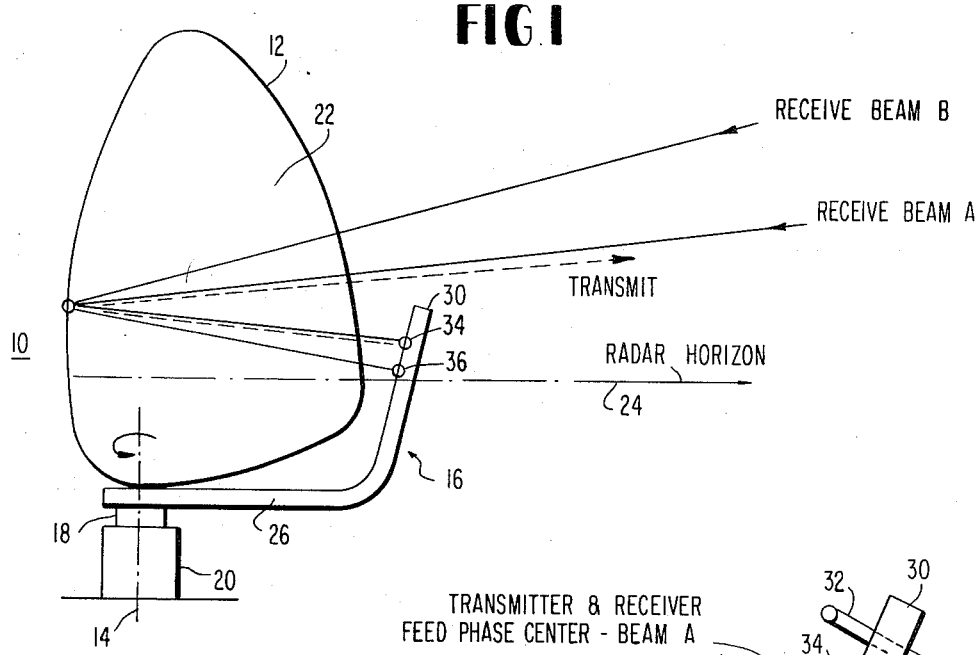
FIG. 1 is a perspective view of a search radar antenna configuration including the subject invention.

Attention is now directed to the Figures and more particularly to FIG. 1 wherein reference numeral 10 generally designates a search radar antenna assembly including a reflector or "dish" 12 which is fixed in attitude during an interpulse period but is adapted to rotate about a vertical axis 14. The reflector 12 may be of a truncated parabolic design or any other suitable shape in order to perform its desired task. In the instant invention, the reflector 12 has for its purpose the transmission and reception of multiple simultaneous beams which are provided by an antenna feed assembly 16. The feed is adapted to be coupled to the radar transmitter and receiver sections, not shown, through a rotating joint 18 coupled to an rf waveguide element 20 located on the vertical axis 14. The feed assembly 16 and reflector 12 are integral with one another and rotate together with a portion of the antenna feed assembly extending outwardly in front of the reflector 12 for directing rf energy to and from the reflector surface 22. Suitable drive means, not shown, are also connected to the antenna assembly 10 for rotating the antenna at a constant rate in a selected attitude with respect to the radar horizon which is shown by the dashed line 24.

Figure 2:
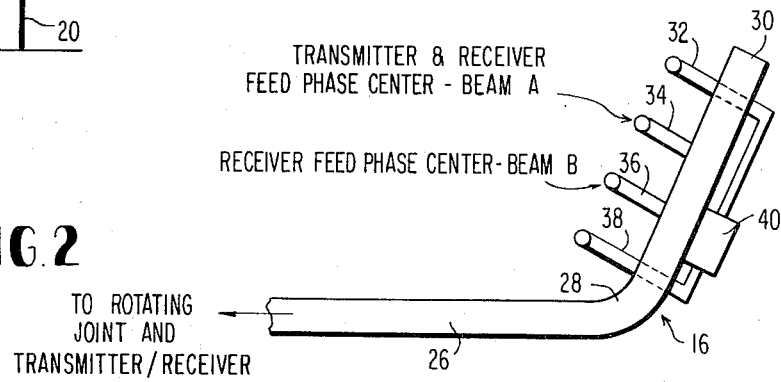
FIG. 2 is a profile view partially in section of the feed configuration taught by the subject invention.

Referring now briefly to FIG. 2, the feed assembly 16 shown in FIG. 1 is disclosed in further detail and includes a substantially horizontal waveguide member 26 which is coupled to the rotating joint 18 shown in FIG. 1. The waveguide 26 proceeds through an angulated portion 28 terminating in a waveguide section 30 which acts as a power divider for a four element dipole array including radiating receiving elements 32, 34, 36 and 38. These four radiating/receiving elements are arranged so that they face toward the reflecting surface 22 of the reflector 12. Microwave power switch means designated generally by reference numeral 40 is mounted on the waveguide portion 30 and is adapted to control power transfer between the dipole elements 32–38 in a manner to be described in connection with FIG. 3.

Figure 3:
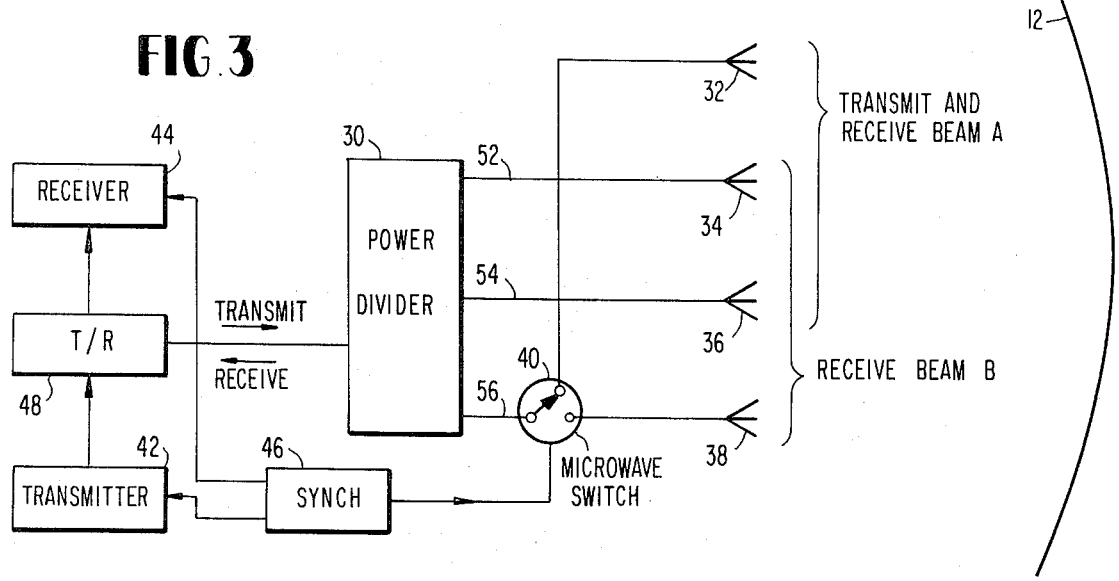
FIG. 3 is a schematic representation of the inventive concept taught by the subject invention.
Figure 4:
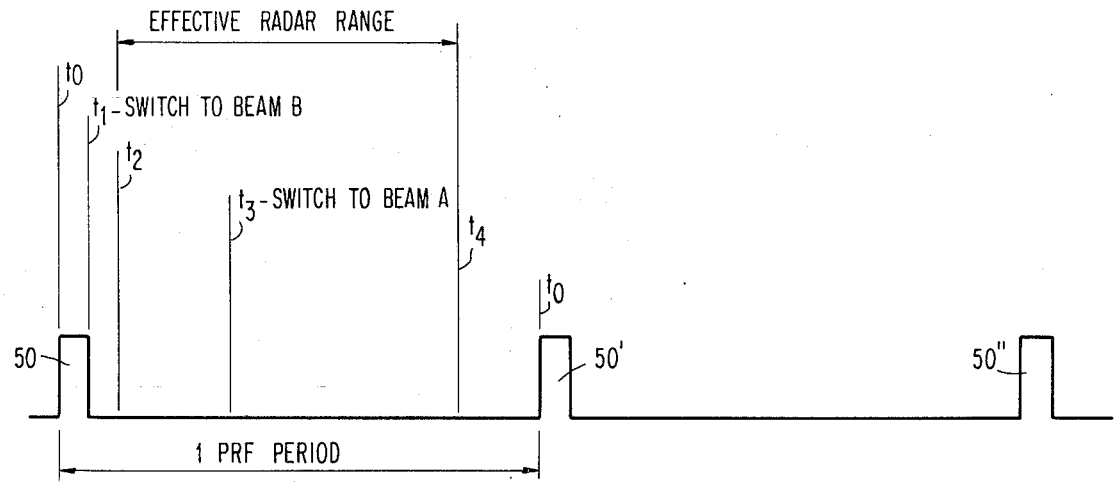
FIG. 4 is a timing diagram illustrative of the operation of the subject invention.

Referring now to FIG. 3, there is illustrated a schematic diagram which is helpful in explaining the operation of the subject invention when taken in connection with the timing diagram shown in FIG. 4. Typically, a search radar includes a transmitter section 42 and a receiver section 44 under the control of a master timing circuit or synchronizer 46 which establishes the pulse repetition frequency (PRF) and gates the receiver on after each transmitter radar pulse. The radar rf pulses are coupled to the radar antenna assembly through a transmit/receive (T/R) switch device 48. The subject invention operates in the following manner. At the beginning of each PRF period $t_0$ (FIG. 4) synchronizer 46 causes the transmitter to generate an rf pulse shown by reference numeral 50, which lasts until the time $t_1$. This rf pulse is fed through the T/R device 48 into the power divider 30 which couples energy into three microwave feeder elements 52, 53 and 54 for the generation of three simultaneous radiated beams. Feeder elements 52 and 53 are continuously coupled to radiating/receiving elements 34 and 36. Feeder element 56, on the other hand, is intermittently coupled to either radiating/receiving element 32 or radiating/receiving element 38 at either end of the array through the microwave switch means 40. During the transmit portion of the PRF interval, synchronizer 46 causes microwave switch means 40 to couple feeder element 56 to radiating/receiving element 32 whereupon a multibeam radiation pattern having a feed phase center at element 34 is directed to the reflector 12 causing a radar beam to be radiated in space. Immediately after the end of the transmit pulse $t_1$, or up to the time $t_2$ corresponding to the minimum range limitation of the radar, the synchronizer 46 operates microwave switch 40, causing it to couple feeder element 56 to radiating/receiving element 38 at the lower end of the array. This produces a receive radiating configuration or gain path comprised of elements 34, 36 and 38 which is adapted to be responsive to a receive beam B shown in FIG. 1 whereas the combination of elements 32, 34 and 36 would be responsive to a receive beam A. Since beam B is at a greater or higher angle with respect to the radar horizon than beam A, it has less ground clutter. Referring now to FIG. 4, there is disclosed typical antenna gain patterns for receive beams A and B which are designated by reference numerals 58 and 60, respectively. Noting that the origin corresponds to the radar horizon, the intersection of the curves 58 and 60 with the ordinate provide a measure of the amplitude of the ground clutter for the receive beams A and B respectively. It can be seen then that the amplitude of the ground clutter for a receive beam B is far less than the amplitude of the ground clutter associated with receive beam A. Therefore, at $t_2$ or between the time $t_1$ and $t_2$ shown in FIG. 3, the synchronizer 46 causes the microwave switch means 40 to provide a gain path to space for beam B which exhibits reduced ground clutter, but nevertheless is adapted to provide radar target return signals for short and intermediate ranges. At a time $t_3$ later after the short and intermediate range returns have been received, the synchronizer 46 causes the microwave switch means 40 to again couple feeder element 56 to radiating/receiving element 32, thereby providing a receive gain path to space for a receive beam A which as shown in FIG. 1 is lower in elevation than beam B. Since the ground clutter has a tendency to mask only short and intermediate range target signals, the long range signals will not be substantially adversely affected due to the fact that these targets have already been received in beam B. In FIG. 4, the time $t_4$ in the inner pulse period corresponds to the time of maximum range limitation which thereafter a subsequent transmitted pulse 50' is radiated.

It is significant to note, however, that the synchronizer 46 continues to couple feeder element 56 to radiating/receiving element 32 during the transmit portion $t_0$-$t_1$ of the interpulse period of the succeeding pulse 50'. Radiating/receiving elements 32, 34 and 36 thus comprise the radiating configuration while element 38 is only utilized during a first portion of the interpulse period following the transmitted pulse during which short and long range targets are received in reduced ground clutter. What is provided therefore is an alternate gain path distinct from a single gain path for example, where antenna elements 32, 34 and 36 would normally be used during both the transmit and receive modes and where for example a beam pattern corresponding to A would be used throughout the operation of the system wherein the amplitude of the ground clutter is significantly higher than operating with the received beam B for a portion of the interpulse period. The operation of the subject invention is in effect the converse of the reflector physically being tilted up or nodded for a short portion of the interpulse period. Since this is impossible due to the high PRF's involved, the same result has been achieved by beam switching of the radiating/receiving elements 32, 34, 36 and 38 in sets of three so that after the transmitted pulse, the antenna electrically "looks up" and then scans down.

Figure 5:
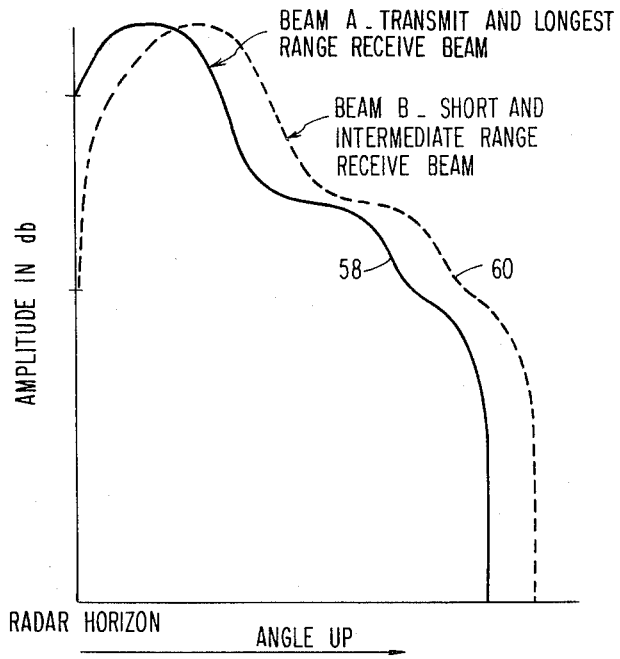
FIG. 5 is a graph illustrative of antenna receive gain patterns helpful in understanding the operation of the subject invention.
Figure 6:
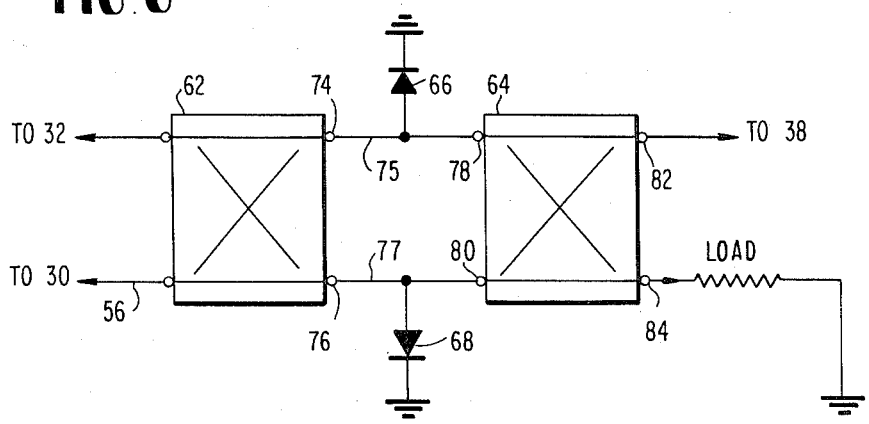
FIG. 6 is a schematic diagram illustrative of a specific switch configuration adaptable for use by the subject invention.

One illustrative means for providing beam switching between the radiating/receiving elements 32 and 38 is provided as an illustrative example by FIG. 5. The configuration shown in FIG. 5 includes a pair of hybrid microwave couplers 62 and 64 and a pair of semiconductor PIN diodes 66 and 68 mounted in the waveguides coupling the hybrid couplers 62 and 64. Hybrid coupler 62 includes four ports 70, 72, 74 and 76 for the transfer of microwave energy while hybrid coupler 64 includes four ports 78, 80, 82 and 84. The port 70 is coupled to the power divider 30 shown schematically in FIG. 3 by means of the feeder element 56. Port 72 is coupled to radiating/receiving element 32 while ports 74 and 76 are connected by waveguides 75 and 77 to ports 78 and 80, respectively, of the hybrid coupler 64. The port 82 of the hybrid coupler 64 is coupled to radiating/receiving element 38 while port 84 is coupled to a microwave load. The diodes 66 and 68 are mounted in waveguides 75 and 77 respectively act as waveguide shorts when forward biased to couple feeder element 56 to radiating/receiving element 32 whereas an unbiased condition couples element 56 to element 38. Accordingly, a circuit terminal 86 is adapted to couple the anodes of the PIN diodes 66 and 68 back to the synchronizer 46 shown in FIG. 3, which generates and applies bias potentials to the diodes 66 and 68 at the proper time. Thus by proper application of bias potentials to the PIN diodes 66 and 68, antenna element is coupled to power divider 30 during the transmit pulse time period and the latter part of the interpulse period while radiating/receiving element 38 is coupled to the power divider 30 for the interpulse time period immediately following the end of the pulse transmission. A similar or like circuit configuration can be made for example with latching ferrite switches and also gas plasma switches when desirable. The configuration in FIG. 5, therefore, is not meant to be interpreted in a limiting sense.

Thus by selective switching between two alternative gain paths during the receive portion of the interpulse period, substantial improvement is realized in radar scope presentation and target tracking by a relatively simple means. Stated another way, the invention is directed to the concept of incrementally relocating a receive beam by switching antenna elements on a time base associated with the PRF so as to enhance the target return with respect to the clutter returns.

I claim:

1. Apparatus for enhancing radar target return signals with respect to clutter return signals, comprising in combination:
   a common transmit/receive antenna assembly for transmitting radio frequency energy generated by an associated transmitter and receiving reflected signals after said transmission, said antenna assembly including;
   a reflector and a plurality of RF transmit/receive feed elements selectively operated as a first set of elements providing a common transmit and a first receive gain path and as a second set of elements providing a second receive gain path, said first receive gain path having a response pattern displaced in a first elevation angle and said second receive gain path having a response pattern displaced in a second elevation angle higher than said first elevation angle and thereby providing an optimum gain path for reducing the amplitude of the clutter return signals; and
   control circuit means coupled to said plurality of RF transmit/receive feed elements being operable to cause said second receive gain path to be established after transmission for a predetermined intermediate time interval wherein relatively short and intermediate range return signals are received, and after said predetermined intermediate time interval and prior to a succeeding transmission rendering said second receive gain path inoperative and to establish said first receive gain path wherein relatively long range return signals are received and to maintain said last mentioned gain path for said succeeding transmission.

2. The apparatus as defined by claim 1 wherein said transmitter transmits pulses having a predetermined interpulse period and wherein said control means comprises RF switch means coupled to said plurality of feed elements, said switch means being operable in a first position to provide said common transmit and said first receive gain path and in a second position to provide said second receive gain path.

3. The apparatus as defined by claim 2 wherein said common transmit and first receive gain path includes the first of said plurality of feed elements and said second receive gain path includes the last of said plurality of feed elements.

4. The apparatus as defined by claim 3 and additionally including an RF power divider coupled to the intermediate feed elements of said plurality of feed elements and said RF switch means selectively couples the first and last feed element to said power divider.

5. The apparatus as defined by claim 4 and additionally including synchronizer circuit means for operating said RF switch means.

6. The apparatus as defined by claim 5 wherein said synchronizer circuit means switches said feed elements to said second receive gain path at time intermediate $t_1$ and $t_2$ wherein $t_1$ is the time at the end of a transmit pulse and $t_2$ corresponds to the minimum range limitation of the radar target return signals.

7. The apparatus as defined by claim 1 wherein said plurality of feed elements is equal to $m$ and said first and second receive gain paths are comprised of n elements each wherein $n$ is less than $m$ and wherein said first receive gain path includes the first feed element of said $m$ elements and said second receive gain path includes the last feed element of said $m$ elements.

8. The apparatus as defined by claim 1 wherein said antenna assembly comprises a power divider and a dipole array of at least four elements coupled to said power divider wherein said intermediate elements are continuously coupled to said power divider and said first and last elements are intermittently coupled to said power divider in said first receive gain path and said second receive gain path respectively.

9. The apparatus as defined by claim 8 and additionally including RF switch means intercoupling said power divider and said first and last feed element.

* * * * *